Patented July 6, 1948

2,444,869

UNITED STATES PATENT OFFICE 2,444,869

MANUFACTURE OF SPONGE RUBBER

William J. Clayton, Mishawaka, and Paul V. Butsch, South Bend, Ind., assignors to United States Rubber Company, New York, N. Y., a corporation of New Jersey No Drawing. Application April 27, 1945, Serial No. 590,735

12 Claims. (Cl. 260—86.5)

The invention relates to the manufacture of sponge rubber and more particularly to the manufacture of sponge rubber from latex.

Sponge rubber is commonly made by preparing a fluid latex foam containing compounding ingredients including zinc oxide, and a delayed gelling agent such as sodium silicofluoride, converting the foam into the desired shape as by pouring in molds or spreading on a travelling belt, permitting the shaped foam to set to an irreversible gel, and vulcanizing at elevated temperature to form sponge rubber. The slightly soluble sodium silicofluoride progressively dissolves and hydrolyzes to hydrofluoric acid which reduces the pH of the latex sufficiently to cause coagulation of the latex after a certain period of time. The reduction in pH increases the solubility of the zinc oxide, thereby increasing the concentration of polyvalent zinc ions which likewise acts to coagulate the latex in the foam. The gelled latex foam, on heating prior to vulcanization undergoes syneresis, or squeezing out of the water from the coagulated rubber gel structure. With natural rubber latex, this syneresis does not appreciably alter the foam structure and the final vulcanized sponge has the visual appearance of the gelled foam before heating. With synthetic rubber latex, such as GR-S latex, however, the foam structure breaks down during the heating and syneresis, and large fissures and cracks appear throughout the thickness of the final sponge, completely destroying its appearance and utility.

According to the present invention, sponge rubber may be made from synthetic rubber latices without collapse of the foam structure during the heating of the gelled foam. The present process is also applicable with advantage to the manufacture of sponge rubber from natural latex because it reduces the distortion sometimes incident to the heating of the shaped gelled foam in the conventional foam sponge processes.

In carrying out the present invention, a fluid latex foam is prepared containing zinc oxide, a sequestering agent for polyvalent zinc ions, an alkylated phenyl monoether of polyethylene glycol, and a slightly soluble salt of fluosilicic acid; viz. sodium, potassium, or barium silicofluoride. The fluid foam is converted into the desired shape in the usual manner before gelling, after which the foam is permitted to gel, and the structure vulcanized at elevated temperature. Preferably the latex containing the polyvalent zinc ion sequestering agent and the alkylated phenyl monoether of polyethylene glycol is whipped into a foam and the zinc oxide and fluosilicate in the form of aqueous pastes are mixed with the foam so that the foam can be shaped as soon after addition of the zinc oxide and fluosilicate as possible in order to prevent premature setting up or gelling of the foam before converting into the desired shape. The applicants have found that they cannot make sponge rubber free from cracks and fissures from synthetic rubber latex, such as GR-S latex, with sodium silicofluoride and zinc oxide as the foam gelling agents unless there is present a sequestering agent for the polyvalent zinc ions and also an alkylated phenyl monoether of polyethylene glycol. The amounts of polyvalent zinc-ion sequestering agent, alkylated phenyl monoether of polyethylene glycol, zinc oxide and fluosilicate are not critical, only small amounts of these materials being necessary. For example, .5 to 2.5 of slightly soluble fluosilicate, preferably sodium silicofluoride, and 1 to 5 parts zinc oxide per 100 parts of rubber are commonly used, and with these amounts, 0.1 to 2 parts of a sequestering agent for polyvalent zinc ions and 0.25 to 3 parts of an alkylated phenyl monoether of polyethylene glycol may be used with satisfactory results, the exact proportions depending on the amount of zinc oxide present for vulcanization purposes and the interval of time desired to elapse between the preparation of the finished fluid foam and the gelling of the foam, so that in process the manipulative operations on the foam may be safely completed before gelling takes place without too great a waste of time.

The latex may be natural rubber latex or a synthetic rubber latex made by conventional emulsion-polymerization methods. In the preparation of the synthetic rubber latex, as is known, polymerizable monomeric compounds are emulsified in an aqueous medium by means of an emulsifying agent, such as a soap or other surface active agent, and the polymerization is made to take place generally at elevated temperatures in the presence of a catalyst and other regulating materials. Examples of such polymerizable material are the various butadienes-1,3, for example, butadiene-1,3, methyl-2-butadiene-1,3 (isoprene), chloro-2-butadiene-1,3 (chloroprene), piperylene, 2,3-dimethylbutadiene-1,3. The polymerizable material as known may be a mixture of such a butadiene-1,3 with another polymerizable compound which is capable of forming a rubber copolymer with butadienes-1,3, for example, up to 70 per cent of such mixture of a compound which contains a $CH_2=C<$ group where at least one of the disconnected valences is attached to an electro-active group, that is, a group which substantially increases the electrical dissymmetry or polar character of the molecule. Examples of compounds which contain a CH₂=C< group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Present day commercial synthetic rubber latices of the above types are an aqueous emulsion polymerizate of chloro-2-butadiene-1,3, known as neoprene latex, aqueous emulsion polymerizates of mixtures of butadiene-1,3 and styrene to form copolymer dispersions, known as GR-S latex, and aqueous emulsion polymerizates of mixtures of butadiene-1,3 and acrylonitrile to form copolymer dispersions, known as GR-N latex.

The term "sequestering agent for polyvalent zinc ions" is used in its commonly accepted meaning as a material which will remove polyvalent zinc ions from solution as by precipitating or insolubilizing the zinc, or by forming relatively soluble but unionized compounds. Such a material which is capable of removing polyvalent zinc ions may be an alkali carbonate, borate, including tetraborate, phosphate, including metaphosphate, sulfite, oxalate, ferrocyanide, ferricyanide, chromate. The term "alkali" referring to such materials is used in its commonly accepted sense as inclusive of ammonium, and alkali-metal salts but exclusive of the alkali-earth or other polyvalent metal salts.

The alkylated phenyl monoethers of polyethylene glycol are well known non-ionic surface-active agents which may be made by the reaction of ethylene oxide on alkylated phenols. They have the general formula:

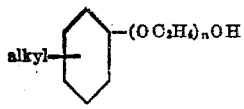

where $n$ is at least 4 and may be as much as 20 or more. For example, alkylated phenyl monoethers of polyethylene glycol, which is the commonly accepted term for the compounds of the above structural formula, may be prepared by the reaction of ethylene oxide on p-isobutyl phenol, p-oleyl ortho cresol, p-isopropyl phenol, p-tertiary butyl phenol, p-tertiary amyl phenol. Examples of commercial alkylated phenyl monoethers of polyethylene glycol are Igepal C and Igepal CA, which are believed to be the reaction product of ethylene oxide and an isopropyl phenol, Triton N-100, and various Intrals, e. g. Intral 224, Intral 229, Intral 384.

The following example is illustrative of the invention:

A latex composition of the following formulation was whipped into a foam in a conventional manner:

| Ingredients | Parts by Weight | |
| --- | --- | --- |
| | Wet | Dry |
| GR-S Latex | 179 | 100 |
| Sulfur (60% aqueous paste) | 5.8 | 3.5 |
| Accelerator (50% aqueous paste) | 2.5 | 1.25 |
| Antioxidant (50% aqueous paste) | 2.0 | 1.0 |
| Triton N-100 | 1 | 1 |
| Potassium ferricyanide (20% aqueous solution) | 2.5 | .5 |

The GR-S latex was a commercial emulsion polymerizate of equal parts by weight of butadiene-1,3 and styrene containing 7% by weight, based on the water phase, of commercial "Ivory Flakes" soap as emulsifying agent. The original concentration of 30% solids of the latex was increased by creaming with a conventional hydrophilic colloidal creaming agent (ammonium alginate) to 56% solids. After whipping the foam to the desired foam density, the foam was transferred to a mixing apparatus equipped with a wire whip. Into the foam was mixed 4.2 parts wet weight of a 60% zinc oxide aqueous paste and then 5 parts wet weight of a 25% sodium silicofluoride aqueous paste. The foam was poured into molds and became gelled in approximately 10 minutes at room temperature (about 70° F.). After the foam had gelled, the molds were heated at 212° F. for three quarters of an hour to vulcanize the gelled mass to rubber sponge, and the sponge was removed from the molds, washed and dried. The finished rubber sponge was not collapsed and was free from cracks and fissures.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of making sponge synthetic rubber which comprises preparing a fluid foam of a synthetic rubber latex comprising an aqueous emulsion polymerizate of material selected from the group consisting of butadienes-1,3 and mixtures of butadienes-1,3 with other polymerizable compounds containing a CH₂=<C group and capable of forming copolymers with butadienes-1,3 and containing 1 to 5 parts of zinc oxide, 0.1 to 2 parts of an alkali salt having a complex ironcyanide anion, 0.25 to 3 parts of an alkylated phenyl monoether of polyethylene glycol, and 0.5 to 2.5 parts of a slightly soluble salt of fluosilicic acid per 100 parts of synthetic rubber, shaping the foam before gelling takes place, permitting the foam to gel and vulcanizing to form sponge synthetic rubber.

2. The method of making sponge synthetic rubber which comprises preparing a fluid foam of a synthetic rubber latex comprising an aqueous emulsion polymerizate of material selected from the group consisting of butadienes-1,3 and mixtures of butadienes-1,3 with other polymerizable compounds containing a CH₂=C< group and capable of forming copolymers with butadienes-1,3 and containing 1 to 5 parts of zinc oxide, 0.1 to 2 parts of an agent which is capable of removing polyvalent zinc ions selected from the group consisting of alkali carbonates, borates, phosphates, sulfites, oxalates, ferrocyanides, ferricyanides and chromates, 0.25 to 3 parts of an alkylated phenyl monoether of polyethylene glycol, and 0.5 to 2.5 parts of a slightly soluble salt of fluosilicic acid per 100 parts of synthetic rubber, shaping the foam before gelling takes place, permitting the foam to gel and vulcanizing to form sponge synthetic rubber.

3. The method of making sponge synthetic rubber which comprises preparing a fluid foam of a synthetic rubber latex comprising an aqueous emulsion polymerizate of material selected from the group consisting of butadienes-1,3 and mixtures of butadienes-1,3 with other polymerizable compounds containing a $CH_2=C<$ group and capable of forming copolymers with butadienes-1,3 and containing 1 to 5 parts of zinc oxide, 0.1 to 2 parts of potassium ferricyanide, 0.25 to 3 parts of an alkylated phenyl monoether of polyethylene glycol, and 0.5 to 2.5 parts of a slightly soluble salt of fluosilicic acid per 100 parts of synthetic rubber, shaping the foam before gelling takes place, permitting the foam to gel and vulcanizing to form sponge synthetic rubber.

4. The method of making sponge synthetic rubber which comprises preparing a fluid foam of a synthetic rubber latex comprising an aqueous emulsion polymerizate of material selected from the group consisting of butadienes-1,3 and mixtures of butadienes-1,3 with other polymerizable compounds containing a $CH_2=C<$ group and capable of forming copolymers with butadienes-1,3 and containing 1 to 5 parts of zinc oxide, 0.1 to 2 parts of an alkali salt having a complex iron-cyanide anion, and 0.25 to 3 parts of an alkylated phenyl monoether of polyethylene glycol, and 0.5 to 2.5 parts of sodium silicofluoride per 100 parts of synthetic rubber, shaping the foam before gelling takes place, permitting the foam to gel and vulcanizing to form sponge synthetic rubber.

5. The method of making sponge synthetic rubber which comprises preparing a fluid foam of a synthetic rubber latex comprising an aqueous emulsion polymerizate of material selected from the group consisting of butadienes-1,3 and mixtures of butadienes-1,3 with other polymerizable compounds containing a $CH_2=C<$ group and capable of forming copolymers with butadienes-1,3 and containing 1 to 5 parts of zinc oxide, 0.1 to 2 parts of an agent which is capable of removing polyvalent zinc ions selected from the group consisting of alkali carbonates, borates, phosphates, sulfites, oxalates, ferrocyanides, ferricyanides and chromates, 0.25 to 3 parts of an alkylated phenyl monoether of polyethylene glycol and 0.5 to 2.5 parts of sodium silicofluoride per 100 parts of synthetic rubber, shaping the foam before gelling takes place, permitting the foam to gel and vulcanizing to form sponge synthetic rubber.

6. The method of making sponge synthetic rubber which comprises preparing a fluid foam of a synthetic rubber latex comprising an aqueous emulsion polymerizate of material selected from the group consisting of butadienes-1,3 and mixtures of butadienes-1,3 with other polymerizable compounds containing a $CH_2=C<$ group and capable of forming copolymers with butadienes-1,3 and containing 1 to 5 parts of zinc oxide, 0.1 to 2 parts of potassium ferricyanide, 0.25 to 3 parts of an alkylated phenyl monoether of polyethylene glycol, and 0.5 to 2.5 parts of sodium silicofluoride per 100 parts of synthetic rubber, shaping the foam before gelling takes place, permitting the foam to gel and vulcanizing to form sponge synthetic rubber.

7. The method of making sponge synthetic rubber which comprises whipping into a foam a synthetic rubber latex comprising an emulsion polymerizate of a mixture of butadiene-1,3 and styrene and containing 0.5 to 3 parts of an alkylated phenyl monoether of polyethylene glycol and 0.1 to 2 parts of an alkali salt having a complex iron-cyanide anion per 100 parts of synthetic rubber, mixing therewith 1 to 5 parts of zinc oxide and 0.5 to 2.5 parts of a slightly soluble salt of fluosilicic acid per 100 parts of synthetic rubber, shaping the foam before gelling takes place, permitting the foam to gel and vulcanizing to form sponge synthetic rubber.

8. The method of making sponge synthetic rubber which comprises whipping into a foam a synthetic rubber latex comprising an emulsion polymerizate of a mixture of butadiene-1,3 and styrene and containing 0.25 to 3 parts of an alkylated phenyl monoether of polyethylene glycol and 0.1 to 2 parts of an agent which is capable of removing polyvalent zinc ions selected from the group consisting of alkali carbonates, borates, phosphates, sulfites, oxalates, ferrocyanides, ferricyanides and chromates per 100 parts of synthetic rubber, mixing therewith 1 to 5 parts of zinc oxide and 0.5 to 2.5 parts of a slightly soluble salt of fluosilicic acid per 100 parts of synthetic rubber, shaping the foam before gelling takes place, permitting the foam to gel and vulcanizing to form sponge synthetic rubber.

9. The method of making sponge synthetic rubber which comprises whipping into a foam a synthetic rubber latex comprising an emulsion polymerizate of a mixture of butadiene-1,3 and styrene and containing 0.25 to 3 parts of an alkylated phenyl monoether of polyethylene glycol and 0.1 to 2 parts of potassium ferricyanide per 100 parts of synthetic rubber, mixing therewith 1 to 5 parts of zinc oxide and 0.5 to 2.5 parts of a slightly soluble salt of fluosilicic acid per 100 parts of synthetic rubber, shaping the foam before gelling takes place, permitting the foam to gel and vulcanizing to form sponge synthetic rubber.

10. The method of making sponge synthetic rubber which comprises whipping into a foam a synthetic rubber latex comprising an emulsion polymerizate of a mixture of butadiene-1,3 and styrene and containing 0.5 to 3 parts of an alkylated phenyl monoether of polyethylene glycol and 0.1 to 2 parts of an alkali salt having a complex iron-cyanide anion per 100 parts of synthetic rubber, mixing therewith 1 to 5 parts of zinc oxide and 0.5 to 2.5 parts of sodium silicofluoride per 100 parts of synthetic rubber, shaping the foam before gelling takes place, permitting the foam to gel and vulcanizing to form sponge synthetic rubber.

11. The method of making sponge synthetic rubber which comprises whipping into a foam a synthetic rubber latex comprising an emulsion polymerizate of a mixture of butadiene-1,3 and styrene and containing 0.25 to 3 parts of an alkylated phenyl monoether of polyethylene glycol and 0.1 to 2 parts of an agent which is capable of removing polyvalent zinc ions selected from the group consisting of alkali carbonates, borates, phosphates, sulfites, oxalates, ferrocyanides, ferricyanides and chromates per 100 parts of synthetic rubber, mixing therewith 1 to 5 parts of zinc oxide and 0.5 to 2.5 parts of sodium silicofluoride per 100 parts of synthetic rubber, shaping the foam before gelling takes place, permitting the foam to gel and vulcanizing to form sponge synthetic rubber.

12. The method of making sponge synthetic rubber which comprises whipping into a foam a synthetic rubber latex comprising an emulsion polymerizate of a mixture of butadiene-1,3 and styrene and containing 0.25 to 3 parts of an alkylated phenyl monoether of polyethylene glycol and 0.1 to 2 parts of potassium ferricyanide per 100 parts of synthetic rubber, mixing therewith 1 to 5 parts of zinc oxide and 0.5 to 2.5 parts of sodium silicofluoride per 100 parts of synthetic rubber, shaping the foam before gelling takes place, permitting the foam to gel and vulcanizing to form sponge synthetic rubber.

WILLIAM J. CLAYTON.
PAUL V. BUTSCH.

REFERENCES CITED

The following references are of record in the file of this patent:

UNITED STATES PATENTS

| Number | Name | Date |
|---|---|---|
| 2,111,820 | Steindorff et al. | Mar. 22, 1938 |
| 2,126,275 | Ogolby | Aug. 9, 1938 |
| 2,261,439 | Kelly | Nov. 4, 1941 |
| 2,313,463 | Clayton | Mar. 9, 1943 |